United States Patent [19]

Queveau

[11] Patent Number: 5,031,959
[45] Date of Patent: Jul. 16, 1991

[54] ROOF OPENING DEVICE WITH AT LEAST TWO ORIENTABLE SHUTTERS

[76] Inventor: Gerard Queveau, Amik Farm, Les Boulaies, 79140 Le Pin, France

[21] Appl. No.: 412,437

[22] Filed: Sep. 26, 1989

[30] Foreign Application Priority Data

Sep. 26, 1988 [FR] France .................... 88 12546

[51] Int. Cl.$^5$ ............................... B60J 7/00
[52] U.S. Cl. ........................ 296/223; 296/216; 296/217
[58] Field of Search ............... 296/216, 217, 220, 222, 296/223

[56] References Cited

U.S. PATENT DOCUMENTS

| 3,075,807 | 1/1963 | Werner | 296/223 |
|---|---|---|---|
| 4,157,845 | 6/1979 | Queveau | |
| 4,178,036 | 12/1979 | Kalitz | 296/222 |
| 4,498,701 | 2/1985 | Queveau | 296/216 |
| 4,671,564 | 6/1987 | Sumida et al. | 296/223 X |

FOREIGN PATENT DOCUMENTS

| 0218020 | 7/1986 | European Pat. Off. | |
|---|---|---|---|
| 0309775 | 4/1989 | European Pat. Off. | 296/220 |
| 2234852 | 1/1974 | Fed. Rep. of Germany | 296/222 |
| 2113623 | 8/1983 | United Kingdom | 296/220 |
| 2147943 | 9/1983 | United Kingdom | |

Primary Examiner—Dennis H. Pedder
Attorney, Agent, or Firm—Leydig, Voit & Mayer

[57] ABSTRACT

The present invention relates to a roof opening device, such as a sunroof, comprising a plurality of panels that open at least partially, these panels being adapted for maneuvering into an opened or closed position, either simultaneously or selectively, by means of a series of cams and followers. Preferably, this device is mounted in the roof of a motor vehicle.

11 Claims, 4 Drawing Sheets

ROOF OPENING DEVICE WITH AT LEAST TWO ORIENTABLE SHUTTERS

FIELD OF THE INVENTION

The present invention generally pertains to roof opening devices, these devices being especially useful for ventilating vehicles having a cabin or passenger compartment. More specifically, the present devices are adapted for mounting in the roof of a compartment. The devices comprise a plurality of partially opening shutters which open so as to allow fresh outside air to enter the compartment. As such, these devices are well suited for the ventilation of land vehicles, such as automobiles, watercraft, or any other application wherein ventilation of an enclosed area is required.

BACKGROUND OF THE INVENTION

Prior to the discovery of the present invention, roof opening devices of the bay window type were one of a number of devices used for ventilating passenger compartments. These devices generally comprise a movable, and most often transparent, panel, one side of which is mounted in a hinged manner. When placed in the roof of a vehicle, for example, the movable panel would be raised outwardly thus increasing the degree of ventilation experienced by persons riding within the compartment.

In the case of a large compartment, however, a single opening is not always sufficient to insure adequate ventilation of the entire enclosure. In such a case, different devices are used which are adapted for mounting in the roof of such a compartment. These devices generally comprise a plurality of shutters that are mounted such that the shutters will at least partially open and close. This arrangement allows passengers in the forward part of the compartment as well as those in the rear portion to be adequately ventilated. Typically, however, in this type of device or ventilation system, an individual control is required for each shutter utilized. This type of system requires an operator to individually set the degree of opening of each shutter of the device. Further, this arrangement does not allow for a series of shutters to be operated or adjusted from a central point which is accessible to, for example, the driver of the vehicle.

Thus, and despite the devices currently available, there remains a need for a roof opening device which will allow the operator of the vehicle into which the device is installed to adjust the level of ventilation in the compartment by individually or collectively setting the degree of opening of the shutters. Moreover, the means for executing these settings should be designed in such a manner so that all of the variations in shutter settings are controllable from a single location, preferably within the reach of the operator.

Accordingly, it is an object of the present invention to provide a device which is adapted for mounting in the roof of an enclosed compartment which comprises a plurality of shutters that open at least partially, wherein the opening and closing of these shutters is controllable by a single means such that an operator of the vehicle in which the device is installed may regulate the ventilation of the compartment through the use of the single means.

A further object is to provide a device wherein the single means for maneuvering the shutters will allow the individual shutters which comprise the device to be opened or closed simultaneously or selectively.

Yet another object of the present invention is to provide a device which further comprises a panel such that the panel opens at least partially and also moves relative to the device wherein the movement of the panel is controllable from the single means used for maneuvering the shutters.

These objectives, as well as others that will become apparent, are attained by the present invention which contemplates a device for ventilating an enclosed compartment having a longitudinal axis comprising a plurality of shutters adapted for at least partial opening toward the outside of the compartment, a plurality of cams at least one of which is in communication with each of the transverse ends of said shutters, and a plurality of governing runners comprising rolling members which members are adapted for communication with said cams, said governing runners being movable along an axis parallel to the longitudinal axis of the compartment, the diagonally opposed governing runners being connected by a single maneuvering means wherein the opening of said shutters is controlled by said means.

The device may advantageously further comprise at least one orientable panel, located between said shutters, said panel being adapted for at least partial opening toward the outside of the compartment and movement relative to the compartment, at least one of said cams being in communication with each of the transverse ends of said panel, said cams being adapted for communication with said rolling members such that the orientation of said panel is controlled by said single maneuvering means.

These and other features and advantages of the present invention will be more readily apparent after examining the following description of the preferred embodiment, which is included for illustrative purposes only, and upon reference to the accompanying drawings wherein:

DETAILED DESCRIPTION OF THE DRAWINGS

DETAILED DESCRIPTION OF THE PREFERRED EMBODIMENT

While the present invention will be described in connection with a preferred embodiment, it will be understood that I do not intend to limit the invention to this particular embodiment. On the contrary, it is intended to cover all alternatives, modifications, and equivalents as may be included within the spirit and scope of the inventions defined by the appended claims. For example, although the present invention will be described herein as useful for the ventilation of a vehicular passenger compartment, it should be appreciated that the device may be utilized for ventilating any number of types of enclosed compartments.

Figure 1:
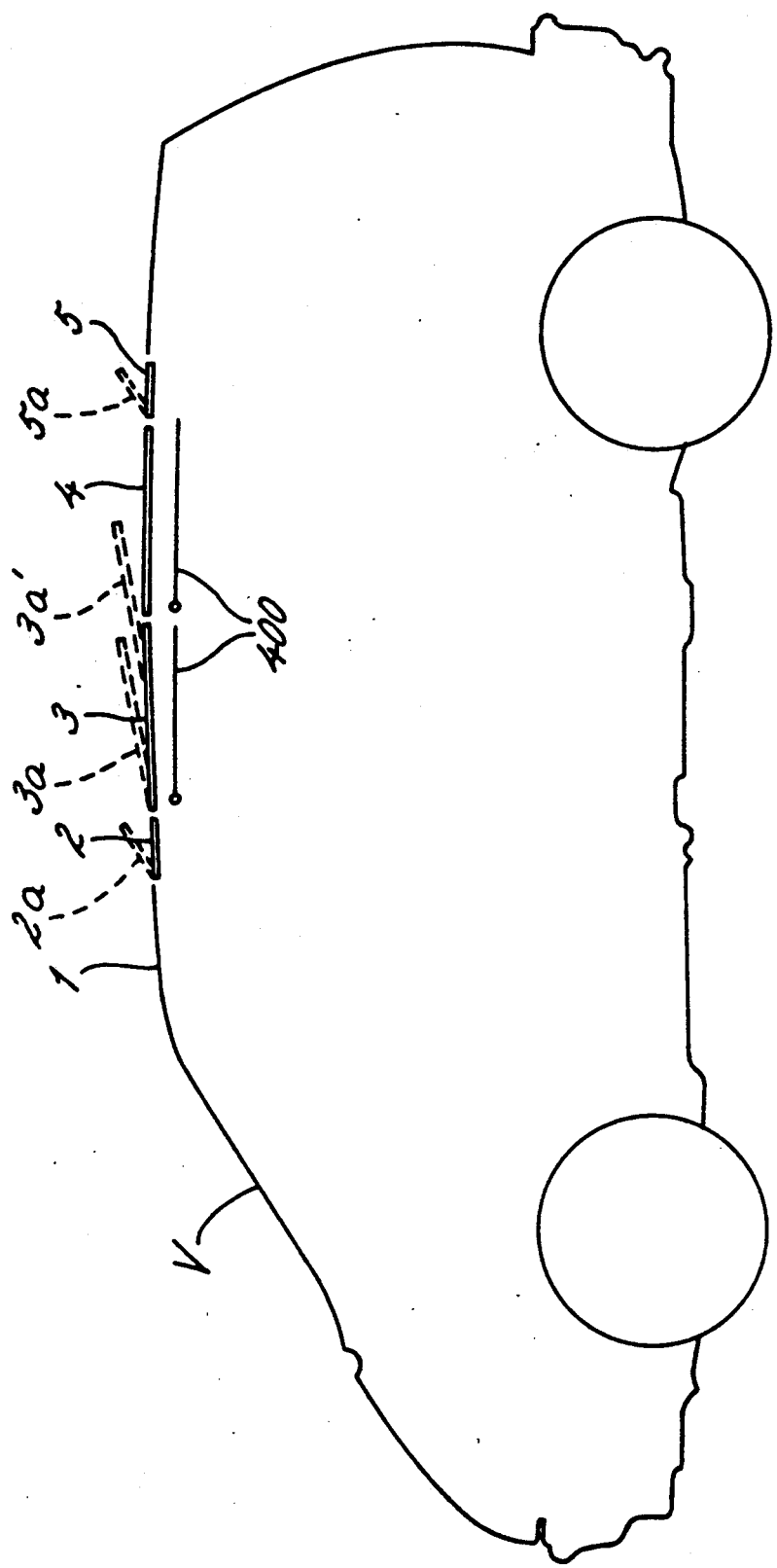
FIG. 1 is a schematic side view of the roof opening device as mounted in the roof of a vehicle.

The roof opening device contemplated by the present invention comprises four panels which are placed in alignment on the roof 1 of the vehicle V, as exemplified in FIG. 1. A first small movable forward panel or shutter 2 is mounted such that it is capable of partially opening (as illustrated by the dotted lines 2a) toward the outside of the cabin of the vehicle. This opening allows ventilation to reach the general area surrounding the front passengers. A large panel 3 is located to the rear of shutter 2, this panel 3 being capable of partial opening (as illustrated by the dotted lines 3a) such that the forward middle part of the compartment is ventilated. Further, this panel 3 is adapted for sliding over the roof 1 (as illustrated by the dotted lines 3a'), thus creating an opening above the forward middle part of the cabin. When the panel 3 is slid over the roof 1, the movable shutter 2 acts as an air deflector, i.e., it orients the small streams of air such that these streams will not enter the cabin and cause noise and turbulence. If desired, a third panel 4 can be placed to the rear of panel 3. This panel 4 may be either fixed or removable; if removable it can create an opening over the rear middle of the roof 1 when removed. A fourth small panel or shutter 5 is placed to the rear of panel 4 and is capable of being partially opened toward the outside of the compartment (as illustrated by the dotted lines 5a). The various panels 3, 4, and movable shutters 2, 5, may be comprised of glass, sheet metal, various synthetic materials, or any other suitable material.

Advantageously, at least one darkening curtain 400 can be provided to unfold over all or part of the surface of the panels 3 and 4. This is particularly useful when transparent panels are utilized.

Figures 2, 2A:
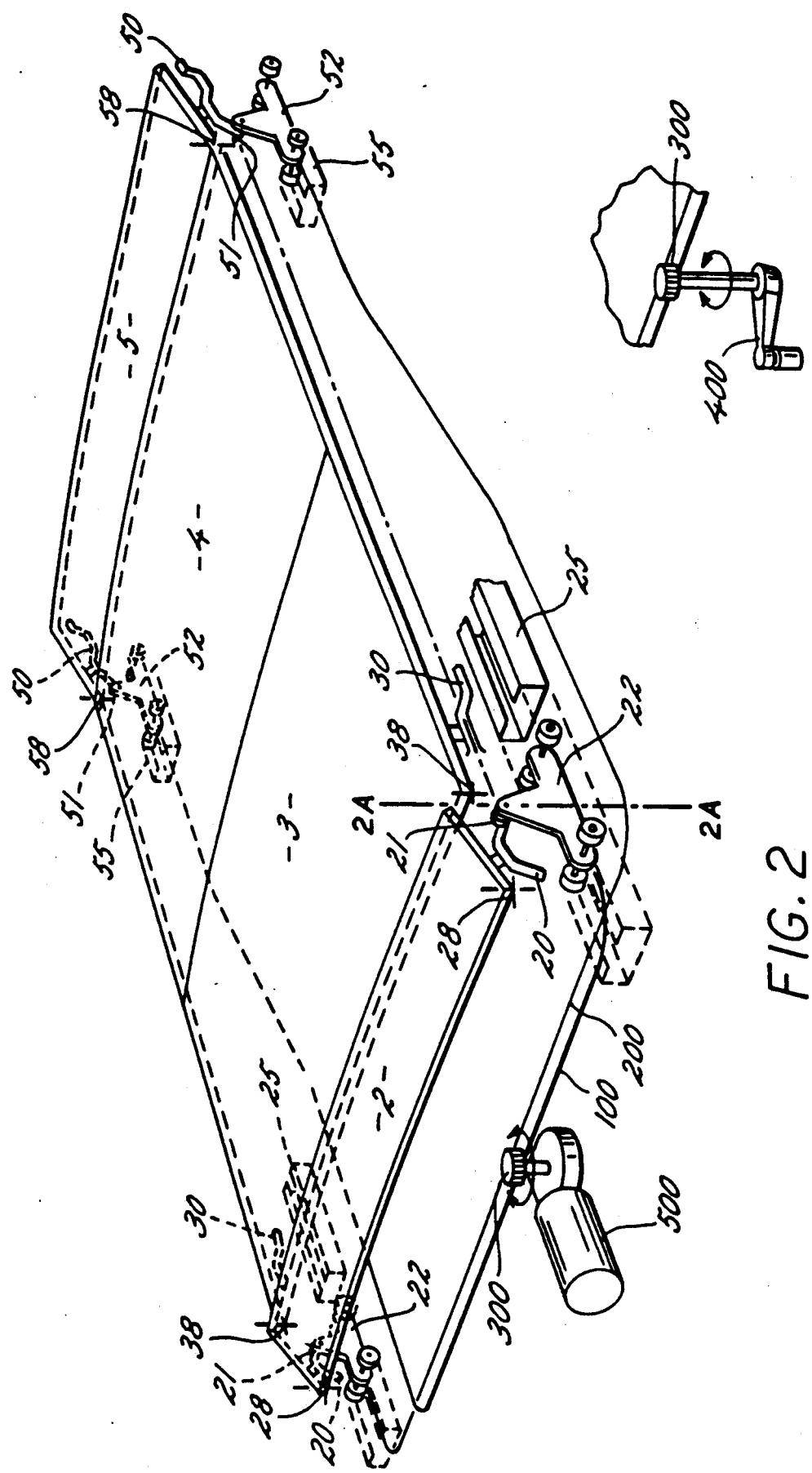
FIG. 2 is a diagram of an overhead view of the roof opening device.
FIG. 2a is a diagram of a portion of the roof opening device of FIG. 2 which shows an alternative embodiment of the present invention which uses a handle crank, as opposed to a motor, as a means of driving the maneuvering means.

Referring now to FIG. 2, each one of the previously mentioned movable shutters 2, 5, the shape of which is approximately rectangular, cooperates at each one of its transverse ends with a cam 20, 50, which guide rollers 21, 51, these rollers being integral with governing runners 22, 52. More specifically, each movable shutter 2, 5 is associated with a set of two identical cams, respectively 20, 50. The governing runners 22, 52 are adapted for moving in alternating directions along the longitudinal axis of the roof, the axis being determined by a set of rails 25, 55, placed on each side of the movable shutters 2, 5, within which the above-mentioned runners 22, 52 move. The rails 25, 55, respectively are adapted for guiding the runners 22, 52.

The diagonally opposed runners 22, 52 of the two movable shutters 2, 5, respectively, are connected in pairs by conventional push/pull cables 100 and 200, such that the diagonally opposed runners will move simultaneously, but in opposite directions. The cables 100, 200 are simultaneously driven, but in opposite directions, by a pinion 300 mounted on a shaft. This pinion is adapted for rotation by rotation means, for example, a hand crank 400 or an electric motor 500.

Each of the shutters 2, 5 are mounted in an articulated manner on shafts, respectively 28 and 58. These shafts are oriented in a direction approximately perpendicular to the longitudinal axis of the roof as well as to the front of each of the above-mentioned movable shutters such that the latter can be at least partially opened by rotation around the respective shafts.

The above-mentioned cams 20, 50 of the shutters 2, 5, respectively, have a trapezoidal wave shape such that the movement of the runners 22, 52 when cables 100, 200 are operated will cause said movable shutters 2, 5 to at least partially open, this movement resulting from the displacement of the rollers 21, 51 in the cams 20, 50.

As explained in detail below, according to one aspect of the present invention, the present invention further contemplates that the movable shutters 2, 5 can, either selectively or simultaneously, be at least partially opened or closed.

As illustrated in FIG. 2, the movable panel 3 further comprises a set of two cams 30 which are located at transverse ends of the panel 3 and adapted to accept the guide rollers 21 as the runner 22 travels along a rail 25. Panel 3 is mounted in a movable manner on a shaft 38 which is placed approximately perpendicular to the longitudinal axis of the roof 1 and to the front of the above-mentioned panel 3. Shaft 38 can be moved bidirectionally along the longitudinal axis of the roof i.e., toward the front of the roof or toward the rear of the roof.

Figure 3:
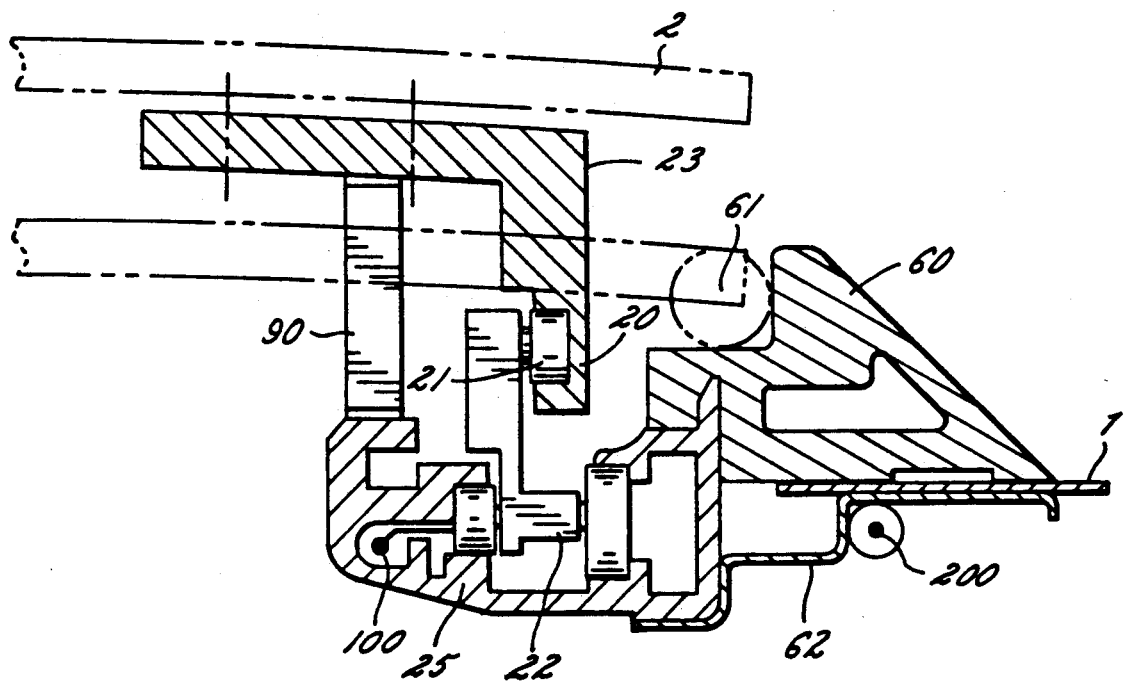
FIG. 3 is a sectional view of a portion of the roof opening device taken at section line A—A of FIG. 2.

Referring to FIG. 3, the panels 3, 4, and the movable shutters 2, 5, are held in place in the roof 1 by means of a frame 60 the overall shape of which is approximately rectangular. The frame may be made of molded synthetic material or of molded aluminum. The frame will advantageously have a narrow profile which is welded, glued, or assembled in any other suitable manner.

As noted, the device contemplated by the present invention, comprising several panels, may be mounted in the roof of a vehicle. The fixation of the device within the roof is achieved by means of a counter frame 62 assembled to frame 60. Gasket material is placed around each one of the panels 3, 4 and the movable shutters 2, 5 such that water is prevented from running inside the cabin when the shutters and the panels are in the closed position. This aspect of the device is best exemplified in FIG. 3. Generally, the shutter 2 is fixed to a bracket 23 which may also carry shaft 28 (illustrated schematically in FIG. 2). Each one of the shutters 2, 5 and the panel 3 has a specific set of brackets in which the cams 20, 30, 50, are placed, respectively. For two of the shutters 2, 5, a blade type spring 90 which is adapted for holding the shutter in an open position, is placed between the rail 25 and the bracket 23 such that, when the shutter 2 is in a partially opened position, the latter is held in that position by the action of the blade-type spring 90 that works by exerting a compressive force.

The contemplated roof opening device is generally symmetrical relative to the longitudinal axis of the roof. As such, the function of the device will be exemplified by describing the action of those elements located on only one of its lateral faces. More specifically, the left lateral face as shown in FIGS. 4a through 4e will be used.

Figure 4A:
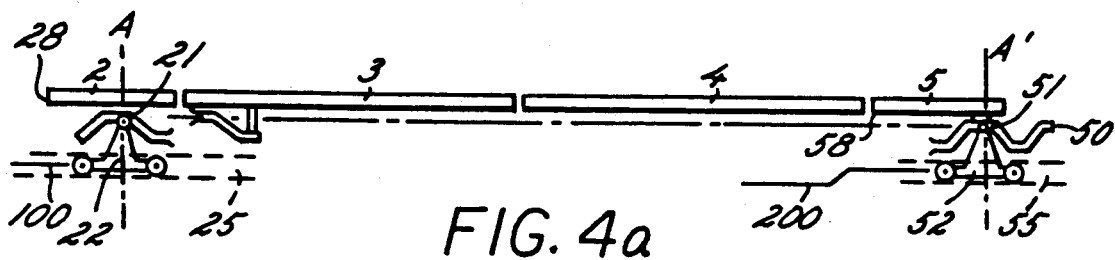
FIGS. 4a through 4e represent in a schematic manner the different positions of the movable shutters and of the panels.
Figure 4B:
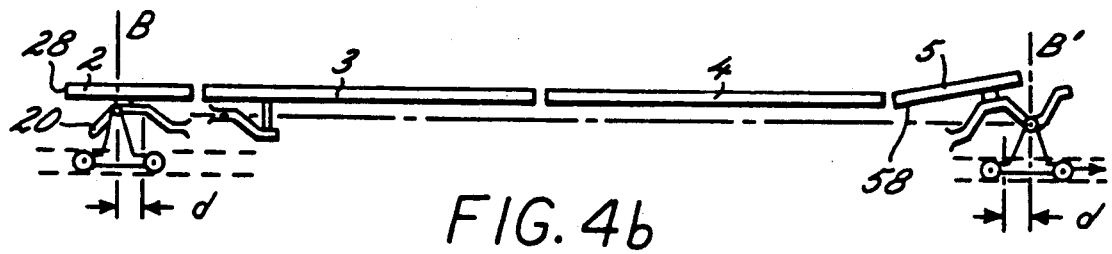

The cam 20 which is fixed to the shutter 2 has the shape of a wave comprising a peak and depression. In the closed position, the two shutters 2, 5, and the rollers 21, 51 that cooperate with the cams 20, 50 associated with the two shutters 2, 5, are respectively positioned at A and A'. This positioning corresponds to the peaks of the cams 20, 50 as is illustrated in FIG. 4a. When the runner 22 is moved toward the front of the roof by means of cable 100 over a distance d, the runner 52 is displaced toward the rear of the roof under the action of cable 200 over a distance d. As explained above, the cables 100, 200 work in an opposite manner by means of the pinion 300. At the conclusion of the aforementioned movement, the position of the runners 22, 52 and rollers 21, 51 are respectively positioned on a peak B of cam 20 and in a depression B' of cam 50. The positioning of roller 51 in the depression B' of cam 50 results in the rear shutter 5 rising by rotation of same around its shaft 58, while the front shutter 2 remains in a closed position. This is exemplified in FIG. 4b.

Figure 4C:
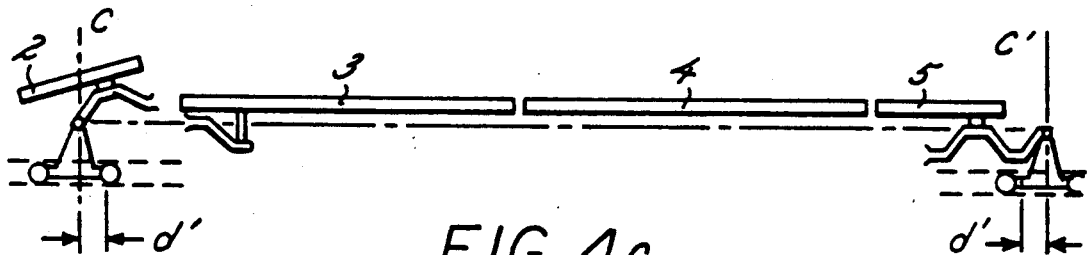

If runner 22 is again displaced toward the front of the pavillon over a further distance d', the roller 21 will position itself in a depression C of cam 20, thus opening shutter 2, while, in a symmetrical manner, the roller 51 is displaced toward the rear of the pavillon over a distance d', thus positioning itself in a depression C' of cam 50 and closing shutter 5. This effect is illustrated in FIG. 4c.

Consequently, by rotating the pinion 300 in a clockwise direction, the cables 100 and 200 are driven in opposite directions. This results in the selective partial opening of shutter 5 and then the opening of shutter 2. The closing of the two shutter 2, 5 is obtained by returning the shutters to their initial position through the rotation of pinion 300 in counterclockwise direction. This position corresponds to the position of the shutter illustrated in FIG. 4a.

Figure 4D:
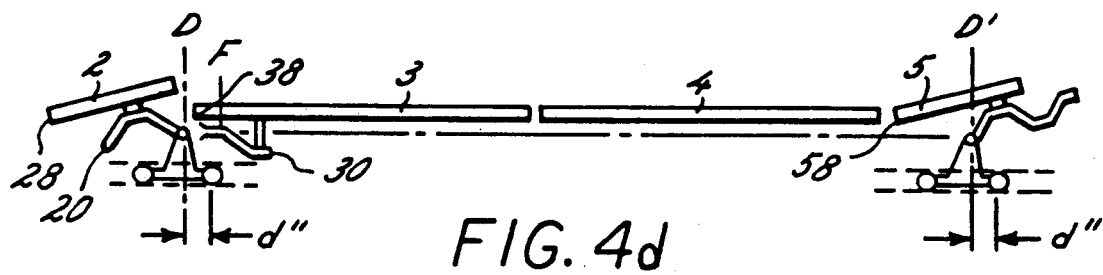

Advantageously, a panel 3 that is adapted for at least partial opening and movement along the longitudinal axis is positioned at the rear of shutter 2. This panel 3 communicates with a set of cams 30 in the shape of a half wave which presents a peak F and a depression E. From the initial position, the pinion 300 is rotatably driven in the counterclockwise direction. Under this action the runner 22 is displaced toward the rear of the pavillon over a distance d'', while runner 52 is displaced in translation toward the front of the pavillon over the same distance d''. In this position, the roller 21 positions itself in a depression D of cam 20, thus partially opening the shutter 2. Roller 51 positions itself in a similar manner, in a depression D' of cam 50, also partially opening the shutter 5, as illustrated in FIG. 4d.

The cams 20, 50 each have open ends D, D', respectively, that correspond to a depression such that the rollers 21, 51 can leave the interior of the cam when the rollers reach the open ends of the cam. Cam 30 similarly has an open end that corresponds to a peak F such that roller 21 can become engaged in cam 30 when it reaches a point perpendicular to that open end.

Figure 4E:
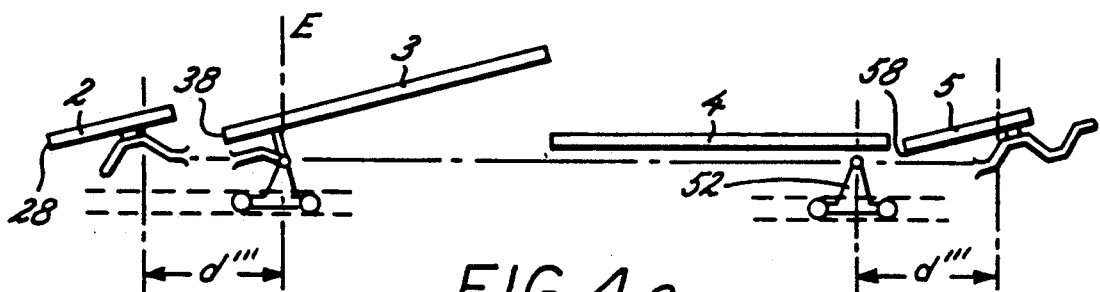
Figure 4F:
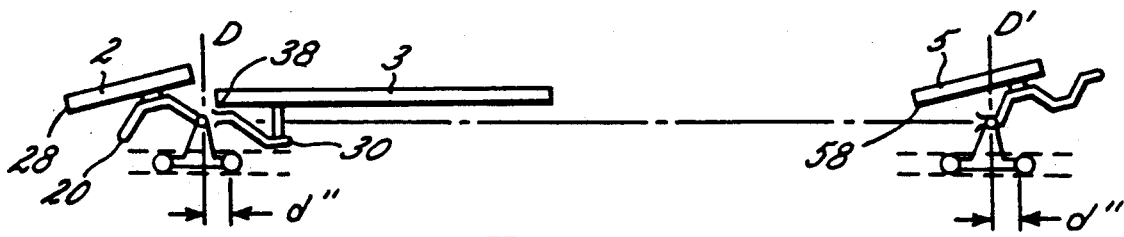
FIG. 4f illustrates in a schematic manner a panel which has been removed from the roof opening device.

Consequently, when the runner 22 is displaced toward the rear of the roof over a distance d''', roller 21 leaves cam 20 and becomes engaged in cam 30 at the point designated by peak F of cam 30. The shutter 2 is held in a partially opened position under the action of the blade-type spring 90 as illustrated in FIG. 3. In a similar manner, the roller 51 exits cam 50 and leaves shutter 5 partially opened under the action of a second blade-type spring 90 (not specifically shown). The roller 21, as it continuously moves toward the rear of the pavillon, positions itself in depression E of cam 30 which communicates with panel 3. This panel 3 will then partially open toward the outside of the cabin by rotating around its shaft 38. Upon reaching the end of the run of cam 30, the roller 21 drives panel 3 toward the rear of the pavillon, as is illustrated in FIG. 4e.

Thus, the rotation of pinion 300 in the counterclockwise direction makes it possible to obtain the partial opening of two movable shutters 2, 5 and, subsequently, the partial opening and the displacement of panel 3.

I claim as my invention:

1. A device for ventilating an enclosed compartment having a longitudinal axis comprising a plurality of shutters, a cam being appended to each of the transverse ends of each shutter, at least two sets of governing runners, each set comprising at least two runners, for engaging said cams and opening said shutters, the first set of runners being located diagonally relative to the longitudinal axis of the compartment and each runner of the second set being located laterally opposite of a respective runner of said first set of runners and diagonally relative to the longitudinal axis of the compartment, and means for maneuvering said runners comprising a first means for connecting the first set of runners and a second means for connecting the second set of runners, wherein the operation of said maneuvering means causes the individual runners of said first and second sets of runners to move in opposite directions with each pair of respective laterally opposed runners of the two sets moving substantially parallel to one another and to said longitudinal axis such that each runner of said pair of laterally opposed runners engage a respective adjoining cam on one of said shutter to selectively open and close said shutter.

2. The device for ventilating an enclosed compartment of claim 1, further comprising a means comprising a blade-type spring for biasing said shutters in the open position.

3. The device for ventilating an enclosed compartment of claim 1, said device further comprising a means for driving said maneuvering means.

4. The device for ventilating an enclosed compartment of claim 1, further comprising at least one panel located between said shutters which can be opened and moved relative to the compartment along the longitudinal axis of the compartment, a cam being appended to each of the transverse ends of said at least one panel, wherein the operation of said maneuvering means causes said runners to engage said panel cams and selectively open and maneuver said at least one panel having cams appended thereto into a plurality of desired positions.

5. The device for ventilating an enclosed compartment of claim 1, wherein said maneuvering means comprises a pinion and said first and second connecting means comprises cable means, each of said cable means engaging an opposite side of said pinion.

6. The device for ventilating an enclosed compartment of claim 4, further comprising at least one panel which is removably appended to said device.

7. The device for ventilating an enclosed compartment of claim 4 which includes a front shutter and a rear shutter which are initially closed as said plurality of shutters, wherein movement of said maneuvering means causes said runners to move along the longitudinal axis of the compartment and engage and disengage from said shutter cams such that upon an initial movement of said maneuvering means said rear shutter opens from an initial closed position, upon further movement of said maneuvering means said rear shutter closes and said front shutter opens from an initial closed position, upon further movement of said maneuvering means said rear shutter opens and the front shutter remains open, and upon further movement of said maneuvering means said at least one panel having cams appended thereto opens and the front and rear shutters remain open.

8. The device for ventilating an enclosed compartment of claim 5, wherein laterally opposed runners are displaced an equal distance upon operation of said maneuvering means.

9. The device for ventilating an enclosed compartment of claim 7, wherein multiple panels are provided and at least one of said panels is transparent.

10. The device for ventilating an enclosed compartment of claim 8, further comprising a means for driving said pinion comprising a hand crank.

11. The device for ventilating an enclosed compartment of claim 8, further comprising a means for driving said pinion comprising an electric motor.

* * * * *

UNITED STATES PATENT AND TRADEMARK OFFICE
CERTIFICATE OF CORRECTION

PATENT NO. : 5,031,959
DATED : July 16, 1991
INVENTOR(S) : QUEVEAU

It is certified that error appears in the above-identified patent and that said Letters Patent is hereby corrected as shown below:

IN THE CLAIMS:

Column 6, line 23, change "shutter" to -- shutters --.

Signed and Sealed this

Tenth Day of November, 1992

Attest:

DOUGLAS B. COMER

*Attesting Officer*     *Acting Commissioner of Patents and Trademarks*